(12) United States Patent
Lawandy et al.

(10) Patent No.: US 7,963,450 B2
(45) Date of Patent: Jun. 21, 2011

(54) NEAR INFRARED INK SECURITY FEATURE

(75) Inventors: Nabil M. Lawandy, Saunderstown, RI (US); Tim Driscoll, Pawtucket, RI (US); Jeff Conroy, East Providence, RI (US); William Goltsos, Warren, RI (US); Charles Zepp, Hardwick, MA (US)

(73) Assignee: Spectra Systems Corporation, Providence, RI (US)

( * ) Notice: Subject to any disclaimer, the term of this patent is extended or adjusted under 35 U.S.C. 154(b) by 429 days.

(21) Appl. No.: 12/214,492

(22) Filed: Jun. 19, 2008

(65) Prior Publication Data

US 2009/0045617 A1 Feb. 19, 2009

Related U.S. Application Data

(60) Provisional application No. 60/936,355, filed on Jun. 19, 2007.

(51) Int. Cl.
*G06K 7/10* (2006.01)
*G06K 19/06* (2006.01)

(52) U.S. Cl. ........ 235/491; 235/375; 235/379; 235/380; 235/454; 235/455; 235/457; 235/487

(58) Field of Classification Search .................. 235/375, 235/379, 380, 454, 457, 487, 491
See application file for complete search history.

(56) References Cited

U.S. PATENT DOCUMENTS

| | | | |
|---|---|---|---|
| 5,760,384 A | 6/1998 | Itoh et al. | |
| 5,974,150 A * | 10/1999 | Kaish et al. | 713/179 |
| 6,174,400 B1 | 1/2001 | Krutak, Sr. et al. | |
| 2002/0071122 A1* | 6/2002 | Kulp et al. | 356/437 |
| 2002/0194494 A1* | 12/2002 | Egger et al. | 713/200 |
| 2003/0205621 A1 | 11/2003 | Soni et al. | |
| 2004/0145726 A1* | 7/2004 | Csulits et al. | 356/71 |
| 2007/0190298 A1* | 8/2007 | Hampden-Smith et al. | 428/204 |
| 2010/0073128 A1* | 3/2010 | Talwerdi | 340/5.8 |

FOREIGN PATENT DOCUMENTS

WO WO 2007/060133 A1 5/2007

OTHER PUBLICATIONS

International Search from International Application No. PCT/US2008/07646 dated Sep. 8, 2008.

* cited by examiner

*Primary Examiner* — Thien M. Le
*Assistant Examiner* — Tuyen K Vo
(74) *Attorney, Agent, or Firm* — K&L Gates LLP

(57) ABSTRACT

Systems and methods of providing a covert security marking for items such as documents, packaging, credit cards, and other valuable goods to combat the steady increase in forgery, counterfeiting, and other fraudulent activities is presented. A spectrally narrow, near infrared ink system serves as the basis of a covert security feature for items of value. Alternatively, or in combination, metal oxides having a substantially narrow absorption band and a maximum absorption wavelength of electromagnetic radiation in the near infrared range are also utilized.

16 Claims, 4 Drawing Sheets

NEAR INFRARED INK SECURITY FEATURE

CROSS-REFERENCE TO RELATED APPLICATIONS

This application claims the benefit of U.S. Provisional Patent Ser. No. 60/936,355 filed Jun. 19, 2007, the entire disclosure of which is incorporated by reference herein.

FIELD OF INVENTION

The present invention relates to security markings and more specifically, to a detectable near infrared ink marking with a narrow absorption band.

BACKGROUND

Identity theft is one of the greatest concerns in the consumer marketplace. With only a small amount of information about an individual, such as an address and a social security number, even an unskilled thief can forge, counterfeit and fraudulently obtain unauthorized access to a consumer's assets, credit lines, bank accounts, and obtain other vital private information. Identity theft has become such an epidemic that all most all major credit card companies and banks offer inexpensive credit monitoring services to their customers, providing constant supervision over a their assets and credit reports.

Likewise, counterfeiting and forgery have become significant concerns in the modern economy and marketplace. Advances in computing technology and printing techniques have increased the incidence of forgeries, counterfeited documents, and other fraudulent activities. Countless areas of today's high-technology society require and rely upon certification, authentication and protection of highly valuable documents, papers or other materials. Fraudulent activities such as counterfeiting currency and forging signatures or handwriting are common. Methods of creating and perfecting forgeries and counterfeit documents, however, have become easier and more available with the advent of highly skilled computer printing and processing. As far back as 1991, the United States Treasury has continually added security safeguard features to the denominations of currency in an attempt to combat the use of counterfeit money. These safeguards have included watermarks, security threads embedding in the paper, microprinting, color-shifting ink, and the use of multicolored bills.

Authentication of valuable documents or materials affects many facets of the economy. Notary publics use a raised stamp to authenticate notarized documents; drivers' licenses, passports and other photographic identification contain holograms and microprinting; sporting memorabilia and retail clothiers use holographic tags and stamps to prove authenticity. Even fashion designers are now including authentication devices in their clothing to prevent passing off of knock-offs as designer products.

A disadvantage to traditional security features is that they are visible and known to the world. If a counterfeiter is aware there is a security thread in a bill or a watermark in a document, replication of the security feature is easier. Once a feature is made known to the public, a counterfeiter may begin to develop specific strategies and solutions to overcome the security protections provided by the specific feature.

There is a need for a covert security marking to be incorporated into important and valuable documents, packaging, and other authentic materials to prevent unauthorized copying, forging, counterfeiting and other fraudulent use.

SUMMARY

Embodiments of the invention include systems and methods of providing a covert security marking for items such as documents, packaging, credit cards, and other valuable goods to combat the steady increase in forgery, counterfeiting, and other fraudulent activities. One embodiment of the invention includes a spectrally narrow, near infrared (near IR) ink system as the basis of a covert security feature for items of value. Other embodiments utilize metal oxides having a substantially narrow absorption band and a maximum absorption wavelength of electromagnetic radiation in the near infrared range.

One embodiment of the invention includes a security feature for authentication of an article comprising a marking using a dye or oxides of metals such as Europium ("Eu"), Neodymium ("Nd"), Praseodymium ("Pr"), Holmium ("Ho"), Erbium ("Er"), Cobalt ("Co"), Dysprosium ("Dy"), Ytterbium ("Yb") and Thorium ("Th") having a substantially narrow absorption band and a maximum absorption wavelength of electromagnetic radiation in the near infrared range. The security feature includes a first illumination source for emitting an electromagnetic signal having a wavelength substantially identical to the maximum absorption wavelength of the dye, a second illumination source for emitting an electromagnetic signal having a wavelength less than the wavelength of the first illumination source and a third illumination source for emitting an electromagnetic signal having a wavelength greater than the wavelength of the first illumination source. A detector is configured to receive a signal comprising at least one electromagnetic radiation signal emitted by the first, second or third illumination source and reflected or transmitted by the article.

According to another embodiment, a method of authenticating an article is presented. The articled is marked with a dye having a substantially narrow absorption band and a maximum absorption wavelength of electromagnetic radiation in the near infrared range. The article is illuminated with at least one of a first, second or third illumination sources. The first illumination source emits an electromagnetic signal having a wavelength substantially identical to the maximum absorption wavelength of the dye, while the second illumination source emits an electromagnetic signal having a wavelength less than the wavelength of the first illumination source and the third illumination source emits an electromagnetic signal having a wavelength greater than the wavelength of the first illumination source. A first reflective signal comprising an electromagnetic radiation signal emitted by the first, second and third illumination source and reflected by the article is detected followed by detecting a second reflective signal comprising an electromagnetic radiation signal emitted by the second and third illumination source and reflected by the article. The first and second reflective signals are differentiated to generate a differential signal.

BRIEF DESCRIPTION OF THE DRAWINGS

These embodiments and other aspects of this invention will be readily apparent from the detailed description below and the appended drawings, which are meant to illustrate and not to limit the invention, and in which.

DETAILED DESCRIPTION

Figure 1:
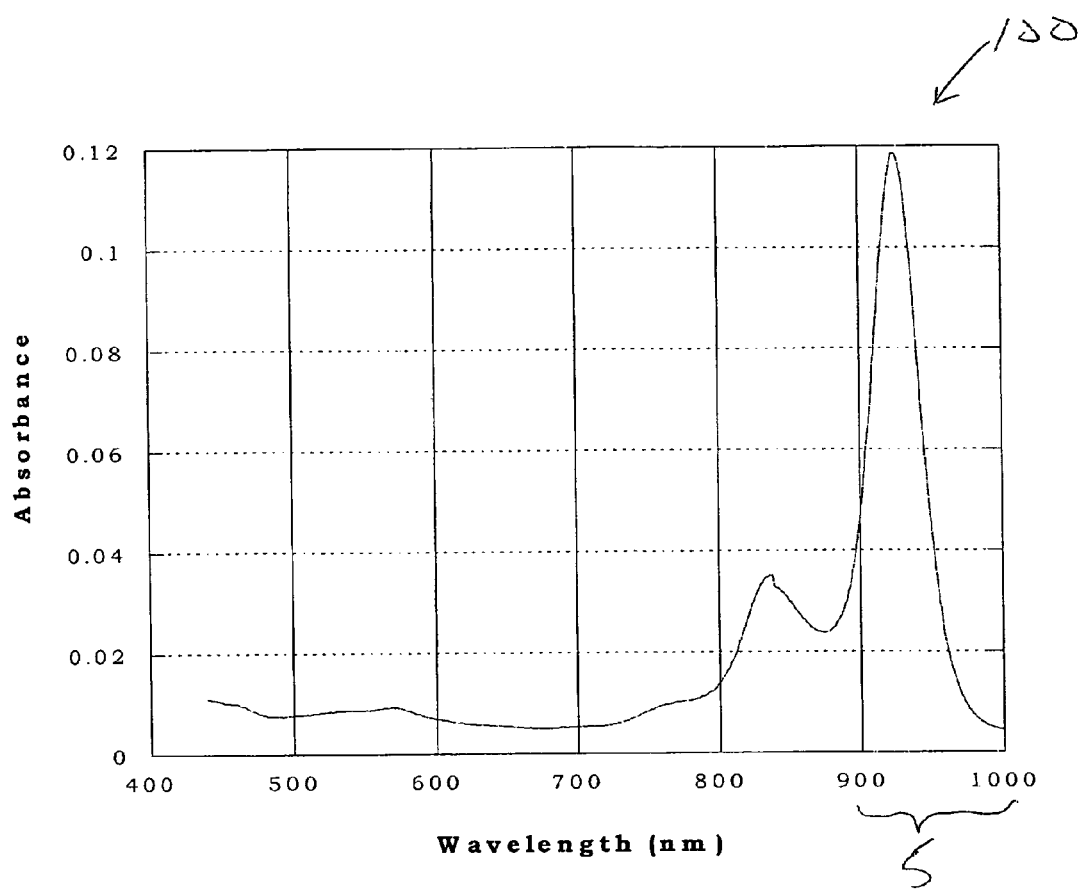
FIG. 1 is a graph of the absorption of a near IR ink as a function of wavelength in accordance with an embodiment of the invention.

Embodiments of the invention rely on measuring a variable reflectivity of near infrared ("IR") inks and metal oxides which may be invisible to the eye or hidden in the aesthetics of the item being marked. Because a wide variety of near IR absorbing dyes and oxides exist, it is necessary to identify a distinguishing characteristic which can be used to discriminate between the authentic near IR dye or oxide and any attempted counterfeits. FIG. 1 depicts a graph (100) of the absorption of a near IR dye as a function of wavelength. The near IR dye is characterized by a narrow absorption band (5).

According to one embodiment, pattern printing the ink on to an item allows for simple authentication of the item by detecting the variable reflectivity of a light emitting diode ("LED") having a wavelength approximating the maximum absorption wavelength of the near IR dye. In the illustrative example dye shown in FIG. 1, the near IR dye has a maximum absorption at a wavelength at or about 930 nanometers ("nm"). Detection of the dye could be deceived, however, by the use of any dye which has a similar strength of absorption at this wavelength. In order to confirm the authenticity of the near IR ink the narrow spectral bandwidth must be measured by also measuring the variable reflectivity of additional LEDs with emission wavelengths on the long and on the short side of the absorption maximum. For example, with a near IR dye having a maximum absorption at about 930 nm, two LEDs with emission wavelengths of 880 and 980 nm may be used to correlate the reflectivity of the three LEDs to authenticate the note. If the item is authentic, a correlation will exist where the detected 930 nm signal is decreased significantly and the measured intensities of the 880 and 980 nm wavelengths are unaffected. The spatial pattern of this correlation would need to match the known print pattern in order for the item to be authenticated. According to one embodiment, the near IR absorbing ink is further characterized as having a sufficiently narrow absorption band such that it can be distinguished from other near IR dyes and pigments.

According to one embodiment, the item or its associated packaging can be authenticated by measuring the reflected signals from an LED with an emission wavelength centered on the absorption maximum of the near IR ink and two LEDs with wavelengths on either side of the peak. These two LEDs should have an emission wavelength that is sufficiently close to the peak to ascertain that the detected dye has a narrow absorption band consistent with that of the authenticating dye. Authentication involves differential analysis of the signals generated when all diodes are on and when only the center wavelength LED is off. In one embodiment, a detector employs a single photodiode, although more robust schemes with additional photodiodes and filtering optics can be implemented.

Figure 2:
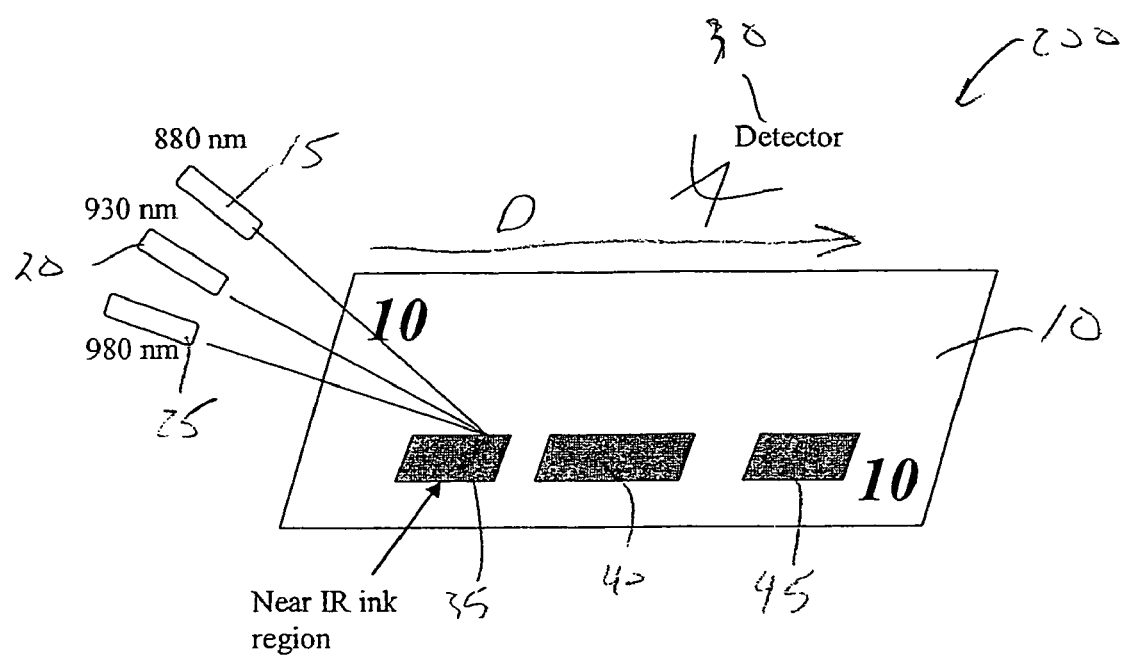
FIG. 2 is a high-level diagram of a detection system in accordance with an embodiment of the invention.

FIG. 2 depicts a detector configuration 200 in accordance with an embodiment of the invention in which a note or bill (10) is marked with a series of three near IR dye regions (35, 40, 45). In one illustrative example, three LEDs with emission wavelengths of 880 nm (15), 930 nm (20), and 980 nm (25) are focused on a region of the note. The LEDs are pulsed, one at a time, at a frequency of about 10 kHz in two different modes. In the first mode, all of the diodes are pulsed to illuminate. In the second mode, only the 880 nm (15) and 980 nm (25) diodes are illuminated. A detector (30), captures the signal traces reflected off of the note (10) as the detector is passed over marked regions (35, 40, 45) the note in a direction (D). The collected signal is analyzed differentially by comparing the reflected signals of the first mode and the second mode. The largest differential signal will occur when the ink region passes through the three beam illumination.

Figure 3:
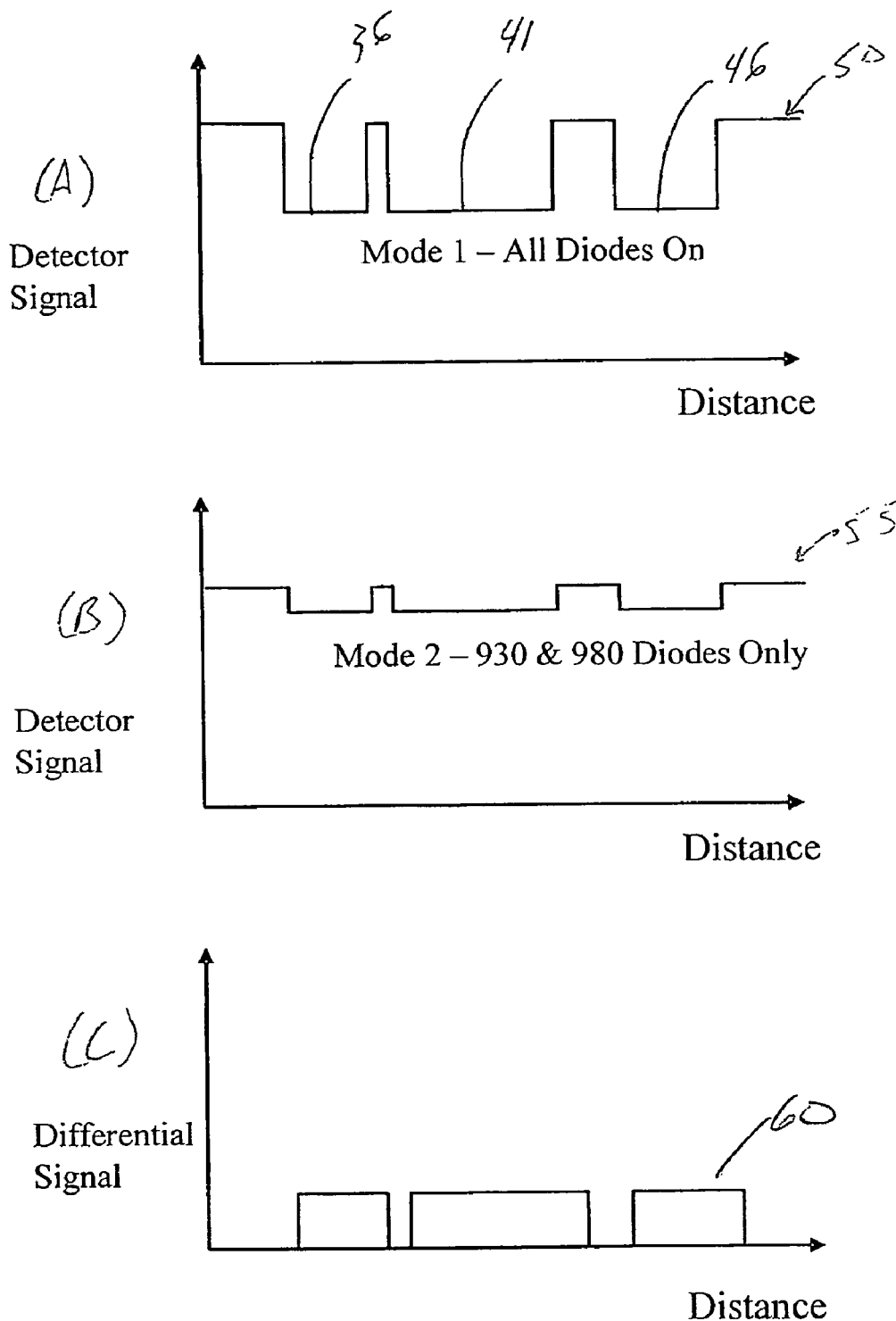
FIG. 3 is series of reflective signals detected by a detection system in accordance with an embodiment of the invention.

FIG. 3 depicts the generated signal traces for the first mode (A), when all of the diodes are on, and second mode (B), when the 930 nm diode (20) is off and the 880 nm (15) and the 980 nm (25) diodes are on. The third plot (C) of FIG. 3 depicts the differential signal created from the first and second modes. According to the illustrative example, when all diodes are illuminated (A), the reflective signal 50 drops when the detector is passed over regions containing the near IR dye due to the increased absorption of the LED light. The first signal drop (36) of FIG. 3 corresponds to the pass of the detector over the first marked area (35); the second drop (41) corresponds to the detector pass of over second marked area (40); and the third drop (46) corresponds to the detector pass over the third marked region (45).

The second plot (B) displays a much smaller change in the reflectivity signal (55) of the 880 nm and 980 nm diodes as they pass over the near IR ink regions. The mismatch of the wavelengths of the diodes and absorption level of the ink results in a reduction in absorption, and thus a smaller drop in the reflection signal when passed over the marked regions.

The third plot (C) represents the differential signal (60) between the reflectance signals of the first and second modes. The differential signal (60) will have value only in the areas the near IR ink was found on the note by the detector. In order for the note to be authenticated, the differential signal must exceed a minimum threshold. The differential method is able to accommodate for the variable reflectivity of the background and any attempts to mimic the feature with broad near IR absorbing materials.

While embodiments described herein depict a dye having a maximum absorption wavelength of electromagnetic radiation at about 930 nm, one skilled in the art that should recognize that other dyes having different maximum absorption wavelengths near the infrared range may be utilized without deviating form the scope of the invention. Similarly, the embodiments disclosed herein, including the exemplary wavelengths of the electromagnetic signals emitted by the illumination sources, should not be seen as limiting and one skilled in the art should recognize that other wavelengths and illumination sources (other than LEDs) may be implemented without deviating from the scope of the invention.

Figure 4:
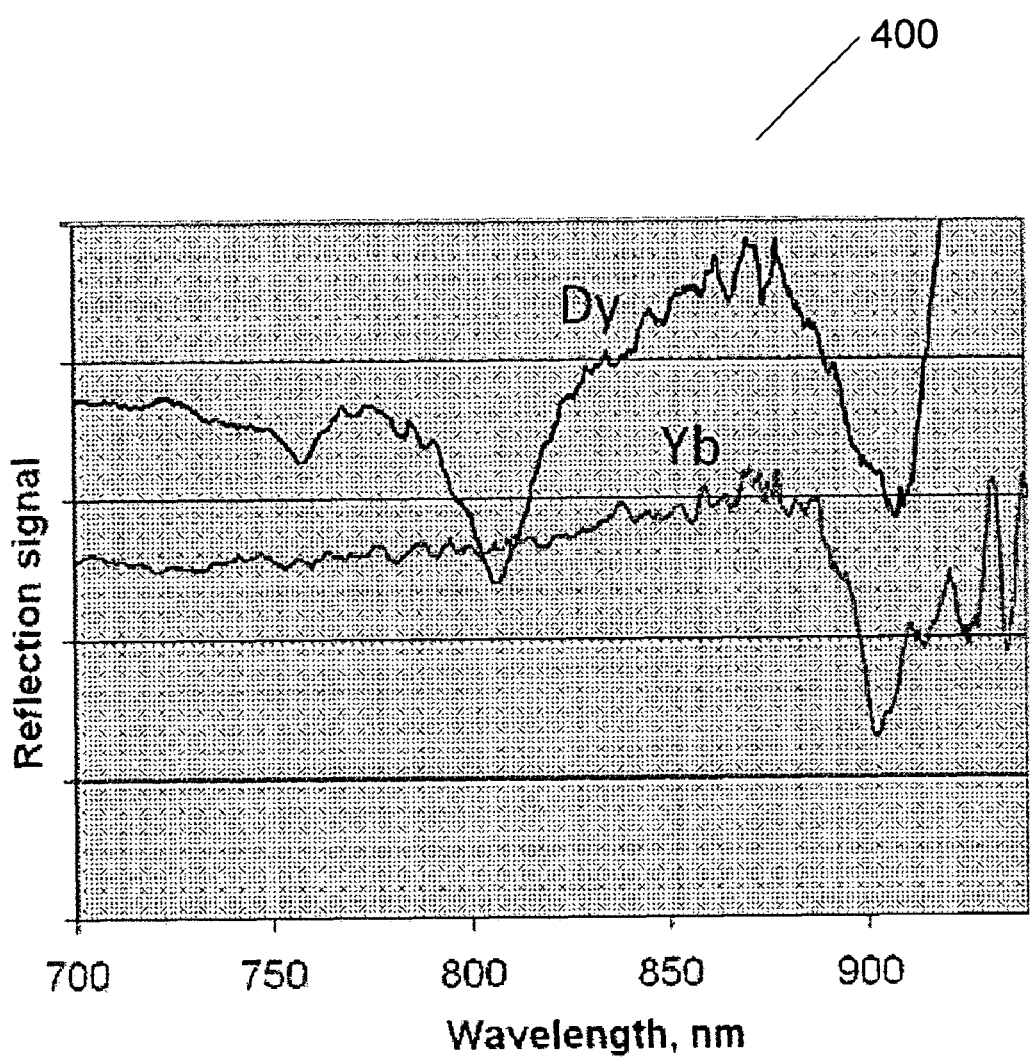
FIG. 4 is a graph of the absorption of two near IR metal oxides as a function of wavelength in accordance with an embodiment of the invention.

As mentioned above, metal oxides having a substantially narrow absorption band and a maximum absorption wavelength of electromagnetic radiation in the near infrared range may also be implemented according to an embodiment of the invention. FIG. 4 is a graph 400 of the absorption of two oxides of metals, Dy and Yb, as a function of wavelength. As shown by the graph, both metal oxides exhibit narrow absorption bands and a maximum absorption near the IR spectrum range. The metal oxide may be incorporated into the markings, as described above with a dye, to yield similar reflection signals with the use of electromagnetic emitting light sources. The metal oxide may also, according to one embodiment be incorporated in combination with a near IR dye to create a more complex marking scheme.

While the embodiments described herein detail the use of a single detector to collect the reflective signals of the LEDs, one skilled in the art should recognize that more than one detector may be used in order to create a more robust detection scheme. For example, three detectors may be utilized, with each detector filtered to collect the reflective signal of one of the illuminating LEDs.

While embodiments of the invention described herein describe multiple marked regions of a note, one skilled in the art should recognize that any pattern or series of markings with a near IR dye may be used without deviating from the scope of the invention. Further, according to one embodiment, the item of interest to be authenticated may be uniformly coated with an ink or coating containing the near IR dye.

Further, while the embodiments herein describe passing a detector over an article of interest, one skilled in the art should recognize that any means of detection may be implemented without deviating from the scope of the invention. For example, the near IR absorbing ink may be printed onto an item or its associated packaging to serve as a machine readable security feature.

Additionally, while the embodiments described herein utilize a single near IR dye or metal oxide absorption as a marking feature, one skilled in the art should recognize that more complex marking schemes may be implemented by the use of more than one near IR ink or metal oxide or a combination of dyes and metal oxides absorbing near the IR range.

While the invention has been described with reference to illustrative embodiments, it will be understood by those skilled in the art that various other changes, omissions and/or additions may be made and substantial equivalents may be substituted for elements thereof without departing from the spirit and scope of the invention. In addition, many modifications may be made to adapt a particular situation or material to the teachings of the invention without departing from the scope thereof. Therefore, it is intended that the invention not be limited to the particular embodiment disclosed for carrying out this invention, but that the invention will include all embodiments falling within the scope of the appended claims. Moreover, unless specifically stated any use of the terms first, second, etc. do not denote any order or importance, but rather the terms first, second, etc. are used to distinguish one element from another.

What is claimed is:

1. A security feature for authentication of an article comprising:
    a marking on the article, the marking comprising a dye having a substantially narrow absorption band and a maximum absorption wavelength of electromagnetic radiation in the near infrared range;
    a first illumination source for emitting an electromagnetic signal having a wavelength substantially identical to the maximum absorption wavelength of the dye;
    a second illumination source for emitting an electromagnetic signal having a wavelength less than the wavelength of the first illumination source;
    a third illumination source for emitting an electromagnetic signal having a wavelength greater than the wavelength of the first illumination source; and
    a detector configured to receive a signal comprising at least one electromagnetic radiation signal emitted by the first, second or third illumination source and reflected by the article, wherein the detector further comprises a differentiator for outputting a differential signal, which is the difference between a first reflective signal and a second reflective signal;
    wherein the first reflective signal comprises electromagnetic radiation emitted by the first, second and third illumination sources and the second reflective signal comprises electromagnetic radiation emitted by the second and third illumination sources.

2. A method of authenticating an article comprising:
    marking the article with a dye having a substantially narrow absorption band and a maximum absorption wavelength of electromagnetic radiation in the near infrared range;
    illuminating the article with at least one of a first, second and third illumination sources, the first illumination source for emitting an electromagnetic signal having a wavelength substantially identical to the maximum absorption wavelength of the dye, the second illumination source for emitting an electromagnetic signal having a wavelength less than the wavelength of the first illumination source, the third illumination source for emitting an electromagnetic signal having a wavelength greater than the wavelength of the first illumination source;
    detecting a first reflective signal comprising an electromagnetic radiation signal emitted by the first, second and third illumination source and reflected by the article;
    detecting a second reflective signal comprising an electromagnetic radiation signal emitted by the second and third illumination source and reflected by the article; and
    differentiating the first and second reflective signals to generate a differential signal.

3. The method of claim 2 further comprising measuring the differential signal against a threshold, wherein the article is authenticated by a differential signal exceeding the threshold.

4. The method of claim 2 wherein the plurality of illumination sources comprise light emitting diodes.

5. The method of claim 2 wherein the second and third illumination sources emit electromagnetic radiation signals having wavelengths within 50 nanometers of the wavelength of the electromagnetic radiation signal of first illumination source.

6. The method of claim 2 further comprising detecting the first and second reflective signals with separate detectors for each illumination source.

7. The method of claim 2 wherein the marking is machine readable.

8. The method of claim 2 further comprising marking the article with a plurality of dyes having substantially narrow absorption bands and a maximum absorption wavelengths of electromagnetic radiation in the near infrared range.

9. A security feature for authentication of an article comprising:
    a marking on the article, the marking comprising a metal oxide having a substantially narrow absorption band and a maximum absorption wavelength of electromagnetic radiation in the near infrared range;
    a first illumination source for emitting an electromagnetic signal having a wavelength substantially identical to the maximum absorption wavelength of the metal oxide;
    a second illumination source for emitting an electromagnetic signal having a wavelength less than the wavelength of the first illumination source;
    a third illumination source for emitting an electromagnetic signal having a wavelength greater than the wavelength of the first illumination source; and
    a detector configured to receive a signal comprising at least one electromagnetic radiation signal emitted by the first, second or third illumination source and reflected by the article, wherein the detector further comprises a differentiator for outputting a differential signal, which is the difference between a first reflective signal and a second reflective signal;

wherein the first reflective signal comprises electromagnetic radiation emitted by the first, second and third illumination sources and the second reflective signal comprises electromagnetic radiation emitted by the second and third illumination sources.

10. A method of authenticating an article comprising:

marking the article with a metal oxide having a substantially narrow absorption band and a maximum absorption wavelength of electromagnetic radiation in the near infrared range;

illuminating the article with at least one of a first, second and third illumination sources, the first illumination source for emitting an electromagnetic signal having a wavelength substantially identical to the maximum absorption wavelength of the metal oxide, the second illumination source for emitting an electromagnetic signal having a wavelength less than the wavelength of the first illumination source, the third illumination source for emitting an electromagnetic signal having a wavelength greater than the wavelength of the first illumination source;

detecting a first reflective signal comprising an electromagnetic radiation signal emitted by the first, second and third illumination source and reflected by the article;

detecting a second reflective signal comprising an electromagnetic radiation signal emitted by the second and third illumination source and reflected by the article; and differentiating the first and second reflective signals to generate a differential signal.

11. The method of claim 10 further comprising measuring the differential signal against a threshold, wherein the article is authenticated by a differential signal exceeding the threshold.

12. The method of claim 10 wherein the plurality of illumination sources comprise light emitting diodes.

13. The method of claim 10 wherein the second and third illumination sources emit electromagnetic radiation signals having wavelengths within 50 nanometers of the wavelength of the electromagnetic radiation signal of first illumination source.

14. The method of claim 10 further comprising detecting the first and second reflective signals with separate detectors for each illumination source.

15. The method of claim 10 wherein the marking is machine readable.

16. The method of claim 10 further comprising marking the article with a plurality of dyes having substantially narrow absorption bands and a maximum absorption wavelengths of electromagnetic radiation in the near infrared range.

* * * * *